(12) United States Patent  
Macaleer et al.

(10) Patent No.: US 8,145,681 B2
(45) Date of Patent: Mar. 27, 2012

(54) SYSTEM AND METHODS FOR GENERATING MANUFACTURING DATA OBJECTS

(75) Inventors: Stephen Macaleer, Malvern, PA (US); John Schaefer, Ambler, PA (US)

(73) Assignee: SAP AG, Walldorf (DE)

( * ) Notice: Subject to any disclaimer, the term of this patent is extended or adjusted under 35 U.S.C. 154(b) by 247 days.

(21) Appl. No.: 12/461,425

(22) Filed: Aug. 11, 2009

(65) Prior Publication Data

US 2011/0040801 A1 Feb. 17, 2011

(51) Int. Cl.
*G06F 17/30* (2006.01)
(52) U.S. Cl. .................................................. 707/803
(58) Field of Classification Search .................. None
See application file for complete search history.

(56) References Cited

U.S. PATENT DOCUMENTS

2008/0133563 A1* 6/2008 Hironiwa ..................... 707/101
2009/0271369 A1* 10/2009 Cheng et al. ..................... 707/3

* cited by examiner

*Primary Examiner* — Belinda Xue
(74) *Attorney, Agent, or Firm* — Finnegan, Henderson, Farabow, Garrett & Dunner, LLP

(57) ABSTRACT

Systems and methods consistent with the invention may include generating, using a processor of the computer system, a definition file of a first format for the data object, generating a database table, generating a mapping between the definition file and the database table, linking the definition file to a data source by including a path of the data source in the definition file, the data source including an attribute, executing, using the processor, a query to extract the attribute from the data source, importing the extracted attribute into the database table using the mapping between the definition file and the database table, and storing, in the memory device, the definition file, the database table, and the attribute for generation of the data object with the attribute.

20 Claims, 9 Drawing Sheets

SYSTEM AND METHODS FOR GENERATING MANUFACTURING DATA OBJECTS

BACKGROUND

1. Relevant Field

Systems and methods consistent with the present invention generally relate to the management of data, particularly within databases. More particularly, systems and methods consistent with the invention relate to the generation and storage of Manufacturing Data Object (MDOs) based on business data of various organizations.

2. Background Information

Businesses and other organizations generate and/or receive a variety of data items and electronic information (broadly referred to hereafter as "business data") during the course of their operation. The business data may be generated and/or received from various entities located in different regions and/or countries. To organize and manage operations of the organization, different departments of an organization may generate different types of data objects based on the business data. These data objects may be used for development and design of complex application programs and/or during operation of complex systems of the organization. Similarly, different organizations may use data objects and application programs that differ from other organizations. Moreover, each type of different data object may be stored in a separate database within storage devices of an organization. As business operations of an organization increase, the use of different types of processes for generation and maintenance of data objects becomes resource intensive.

Despite underlying similarities between processes implemented by different organizations, there is a greater emphasis on the generation of customized application programs and systems for each of these organizations. In emphasizing customization and individuality, conventional techniques for generation and management of data objects disregard the similarities between processes of different organizations and, instead implement resource intensive procedures by individually generating each application program or system from conception to finish. Moreover, conventional techniques manage and store different data objects in separate databases, thus increasing the time and cost for business operations.

SUMMARY

In accordance with one embodiment of the invention, a method for generating a data object is provided. The method is implemented by a computer system and comprises generating, using a processor of the computer system, a definition file of a first format for the data object; generating a database table; generating a mapping between the definition file and the database table; linking the definition file to a data source by including a path of the data source in the definition file, the data source including an attribute; executing, using the processor, a query to extract the attribute from the data source; importing the extracted attribute into the database table using the mapping between the definition file and the database table; and storing, in the memory device, the definition file, the database table, and the attribute for generation of the data object with the attribute.

Consistent with another embodiment of the present invention, there is provided a system for generating a data object. The system comprises a memory device having instructions; and a processor executing the instructions to perform the steps of generating a definition file of a first format for the data object; generating a database table; generating a mapping between the definition file and the database table; linking the definition file to a data source by including a path of the data source in the definition file, the data source including an attribute; executing, using the processor, a query to extract the attribute from the data source; importing the extracted attribute into the database table using the mapping between the definition file and the database table; and storing the definition file, the database table, and the attribute for generation of the data object with the attribute.

In accordance with another embodiment of the present invention, there is provided a computer-readable storage medium including instructions which, when executed on a processor, cause the processor to perform a method of generating a data object. The method comprises generating, using a processor of the computer system, a definition file of a first format for the data object; generating a database table; generating a mapping between the definition file and the database table; linking the definition file to a data source by including a path of the data source in the definition file, the data source including an attribute; executing, using the processor, a query to extract the attribute from the data source; importing the extracted attribute into the database table using the mapping between the definition file and the database table; and storing, in the memory device, the definition file, the database table, and the attribute for generation of the data object with the attribute.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
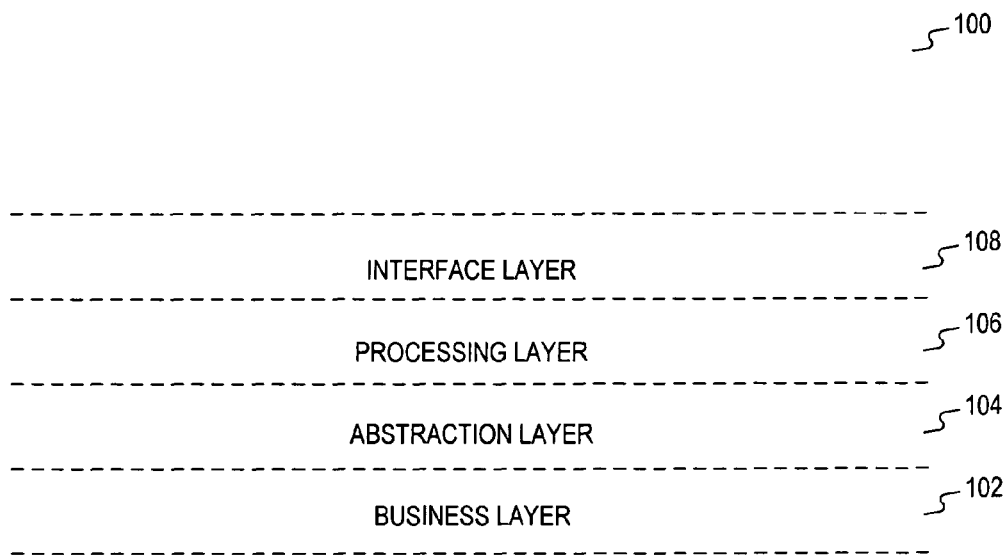
FIG. 1 illustrates an exemplary layered system of an organization, consistent with the present invention.

The following detailed description refers to the accompanying drawings. Wherever possible, the same reference numbers are used in the drawings and in the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Systems and methods consistent with the invention generally relate to optimizing the process of generation and storage of Manufacturing Data Objects (MDOs) that are then used by systems and manufacturing engines run by organizations to monitor their manufacturing processes. Exemplary manufacturing engines that may be used in systems consistent with the invention include those offered by SAP AG, such as SAP Manufacturing Integration and Intelligence (MII). SAP Mll may facilitate quick exchange of information between manufacturing and supply networks to support adjustment of business operations based on changing customer demands. SAP MII may provide a direct connection between shop-floor systems and business operations by ensuring that all data that affects manufacturing is visible in real time, including information about orders, materials, equipment status, costs, and product quality.

For example, as shown in FIG. 1, an exemplary organization 100 may be divided into multiple layers based on their operations. Organization 100 may have a business layer 102 that may depict business operations of an organization 100. These business operations may include operation of manufacturing plants, arrangement of supplies for the manufacturing process, shipping of manufactured products, and sales and marketing of these products. Organization 100 may also include an abstraction layer 104 that may depict the business data that is abstracted from systems run in business layer 102. The abstracted business data may be raw data that has not yet been manipulated or processed, and may be processed in a processing layer 106 of organization 100. Processing layer 106 may include various components including hardware and software, and may be used to implement, for example, SAP MII.

Processing layer 106 may be used to convert business data into data objects. By using an interface layer 108, a user in the organization may use these data objects to deduce information regarding business operations of organization 100. These data objects may also be used to develop composite applications for the organization and may further be integrated with additional systems and databases of organization 100.

Further, in view of similarities between business processes implemented by various organizations, a user may take advantage of the layered structure of organization 100 by using interface layer 108 to define Manufacturing Data Objects (MDOs). An MDO may take advantage of a common reusable business process of an organization by providing a user with the ability to define a set of common data objects. As is described in further detail below, an MDO may be linked to a data source of organization 100 and may be provided a mechanism to extract data from the data source of organization 100. For example, an MDO defined by using interface layer 108 of organization 100 may be linked to a data source in abstraction layer 104. An MDO may be sufficiently generic such that it is easily customized to be used in different systems of organization 100, and to be used in organizations other than organization 100.

Figure 2:
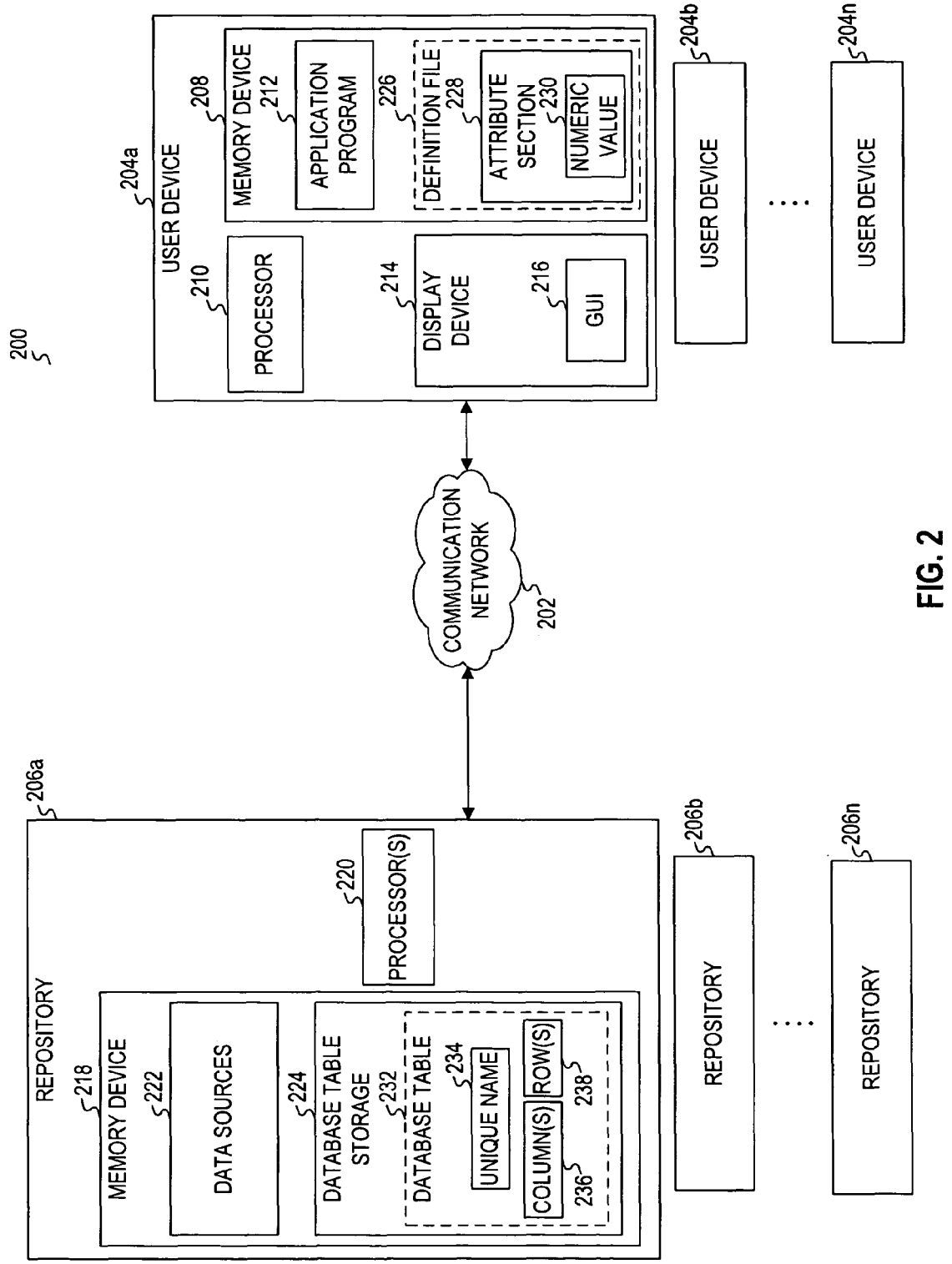
FIG. 2 is a block diagram illustrating a system for generating and storing a Manufacturing Data Object (MDO), consistent with the present invention.

FIG. 2 is a system 200 for generating and storing an MDO that may be implemented in, for example, business organization 100. As shown in FIG. 2, system 200 includes a communication network 202 that facilitates communication between a plurality of nodes 204a-n and 206a-n. Communication network 202 may include one or more network types, such as a wide-area network (WAN), a local-area network (LAN), or the Internet. Communication network 202 may operate by wireline and/or wireless techniques and may use transmission control protocol/internet protocol ("TCP/IP") or any other appropriate protocol to facilitate communication between nodes 204a-n and 206a-n of system 200. Network connections between the nodes of system 200 may be established via Ethernet, telephone line, cellular channels, or other transmission media.

Each node of system 200 may comprise a combination of one or more application programs and one or more hardware components. For example, application programs may include software modules, sequences of instructions, routines, data structures, display interfaces, and other types of structures that execute operations of the present invention. Further, hardware components may include a combination of Central Processing Units (CPUs), buses, memory devices, storage units, data processors, input devices, output devices, network interface devices and other types of components that will become apparent to those skilled in the art.

Consistent with an embodiment of the present invention, nodes 204a-n and 206a-n of system 200 may be respectively implemented by using user devices and repositories. User device 204a may be an appropriate device for sending, receiving, processing, and presenting data. For example, user device 204a may include personal computers, workstations, mainframe computers, notebooks, global positioning devices, and handheld devices such as cellular phones and personal digital assistants.

As is illustrated in FIG. 2, user device 204a may include a memory device 208 and a processor 210. Memory device 208 may be used to store instructions, such as an application program 212, which may be executed by processor 210 to cause user device 204a to implement a plurality of operations. Application program 212 may be used to implement a manufacturing engine such as SAP MII, and processor 210 may cause user device 204a to generate, define, and maintain data objects. User device 204a may also include a display device 214 that may be used to implement a graphical user interface (GUI) 216 to allow a user of user device 204a to interface with at least a portion of system 200. User device 204a may also include additional components such as input and output devices (not shown). User devices 204b-n may also include memory devices, processors, and application programs as described above with respect to user device 204a.

User devices 204a-n may communicate with repositories 206a-n via communication network 202. Repositories 206a-n may be used to classify, manage, and store data objects. Repositories 206a-n may be located in different regions and may comprise a database management system such as a Business One database system from SAP AG. Repository 206a may include a memory device 218 and a processor 220. Memory device 218 may comprise data sources 222 that may be linked to MDOs when the MDOs are defined by, for example, user device 204a. Data sources 222 may store business data of an organization. Memory device 218 may also comprise a database table storage 224 that may include database tables corresponding to the MDOs generated by, for example, user device 204a. Memory device 218 may also include application programs (not shown) that may be executed on processor 220 for management and maintenance of data stored in memory device 218. Repositories 206b-n may also include memory devices, application programs, and processors.

Communication between user devices 204a-n and repositories 206a-n may include sending data, such as requests and queries to repository 206a, and receiving data, such as extracted data objects, from repository 206a.

Although the exemplary embodiment of system 200 is described as having particular components arranged in a particular manner, one skilled in the art will appreciate that system 200 may include additional or fewer components that may be arranged differently. For example, user devices 204a-n and repositories 206a-n may include additional processors and/or memory devices. System 200 may be implemented in a client/server arrangement, and the server may include hardware and software components. Memory devices 208 and 218 may include all forms computer-readable storage mediums such as non-volatile or volatile memories including, by way of example, semiconductor memory devices, such as EPROM, RAM, ROM, DRAM, EEPROM, and flash memory devices; magnetic disks such as internal hard disks and removable disks; magneto-optical disks; and CD-ROM disks.

Consistent with an embodiment of the invention, processor 210 may execute application program 212 to display GUI 216. GUI 216 may be used by a user of user device 204a to generate a definition file 226 of an MDO. Prior to the generation of the definition file, user device 204a may verify the authority and identification of the user who is attempting to generate definition file 226. The verification may be performed based on a username, employee id, and/or additional information provided by the user to user device 204a.

Once the identity and authority level of the user is verified, user device 204a may generate definition file 226 that may serve as a template for the MDO. Definition file 226 may be saved as an extensible markup language (XML) file in memory device 208 and/or in memory device 218, and may include an attribute section 228 including a numeric value 230 indicating the number of attributes of the MDO. An attribute of an MDO may include data values that define properties of the MDO. Numeric value 230 may be provided by the user or may be generated by processor 210 based on default values provided by application program 212. Processor 210 may automatically generate a database table 232 for the MDO, after generation and storage of definition file 226. Database table 232 may have a unique name 234, and may have column(s) 236 and row(s) 238. Unique name 234 of database table 232 and the column name(s) of column(s) 236 may be provided by the user or may be generated by processor 210 in combination with application program 212. For example, the name of a database table may be MDOXXXX where the XXXX may be a unique ID generated based on information indicating a storage location or file id of the definition file, thus creating a correspondence between unique name 234 and definition file 226.

The number of column(s) 236 of database table 232 may correspond to the number of attributes of the MDO as indicated by numeric value 230, and system 200 may link definition file 226 and database table 232. This may be done by generating a mapping between attribute section 228 and the columns names of column(s) 236. Database table 232 may be stored in memory device 208 and/or in database table storage 224. Further, system 200 may temporarily store database table 232 in memory device 208, and may subsequently delete database table 232 from the memory device 208 after storing it in database table storage 224.

As is described in further detail below with respect to FIGS. 3-6, user device 204a may use processor 210 to execute application program 212 to display various screens on graphical user interface 216 to guide the user of user device 204a to configure definition file 226 and database table 232 for the generation of a corresponding MDO. For example, the user may select a query template or a transaction to link database table 232 to data sources 222. The query template or the transaction may be of a specific defined syntax that may be used to, when needed, extract attribute values from data sources 222 into rows 238 and columns 236 of database table 232 that corresponds to the MDO. These extracted attribute values may also be converted into the format of definition file and may be temporarily stored in attribute section 228 of definition file.

User device 204a may also be used to edit and select particular attributes for the MDO, and similarly may be used to edit properties of the selected attributes. Further, metadata corresponding to the MDO and the MDO's attributes, and/or the properties of the MDO may be edited. User device 204a may also be used to change the default display settings of the MDO; to configure the lifecycle of a particular MDO indicating a predetermined period of time or a trigger event after which the definition file and database table of the MDO may be deleted; to configure security settings such that access to the MDO is limited based on roles assigned to users in an organization; and other customization of the MDO based on the specifications of the organization that runs system 200.

Figure 3:
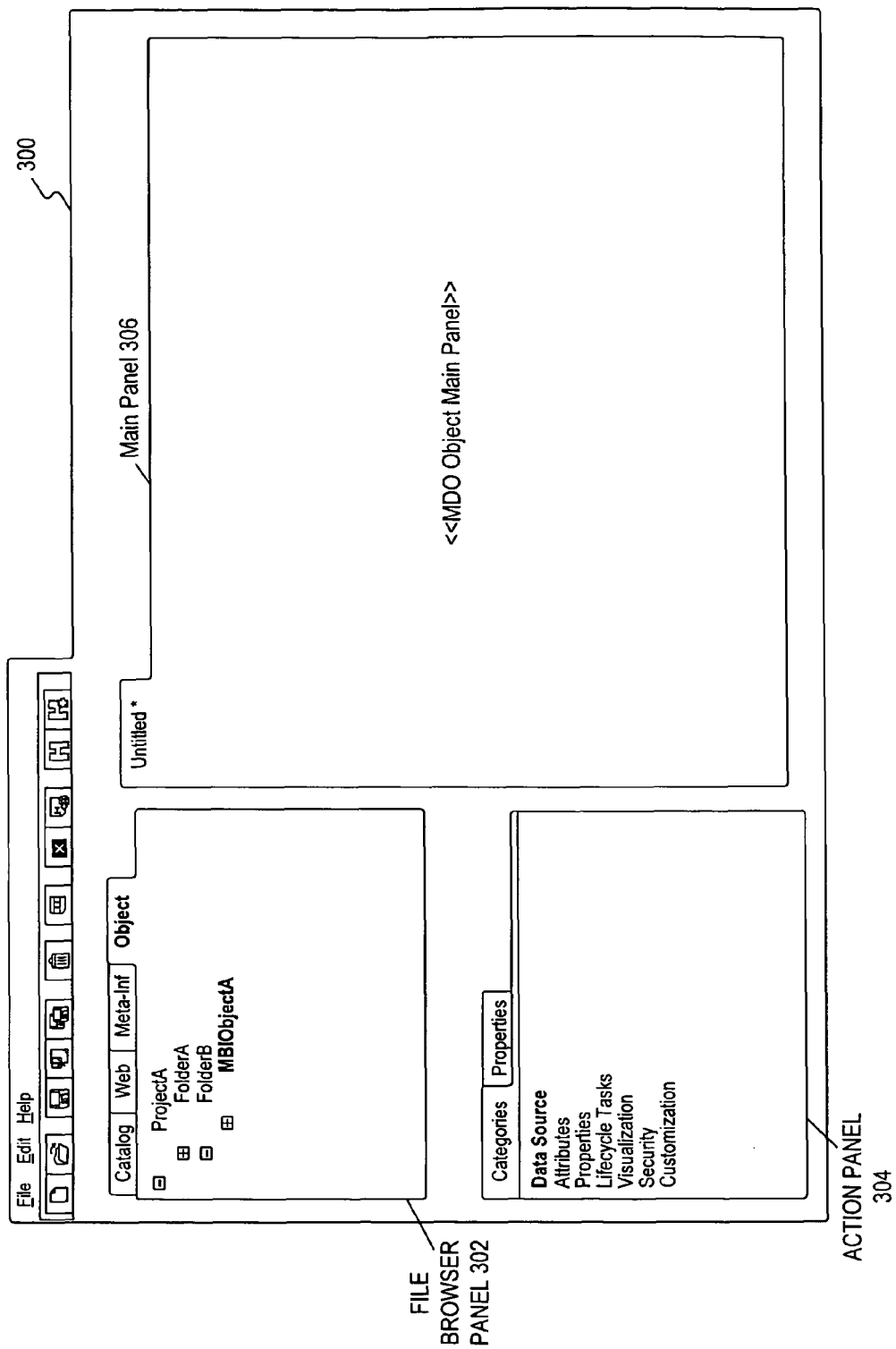
FIG. 3 is a snapshot of an exemplary overview screen displayed during generation of an MDO, consistent with the present invention.

FIG. 3 is a snapshot of an exemplary overview screen 300 displayed during generation of an MDO. Overview screen 300 may be displayed on, for example, display device 214 of system 200. Overview screen 300 may include a file browser panel 302, an action panel 304, and a main panel 306. File browser panel 302 provides a user the ability to browse to a definition file of a particular MDO in order to complete the generation process by selecting various configuration categories of the MDO. The configuration categories may be selected by browsing through action panel 304. Once a particular category is selected in action panel 304, a new screen may be presented in main panel 306 for configuration of that particular category. For example, as is illustrated in FIG. 3, definition file of "ObjectA" is currently selected in file browser panel 302, and the "Data Source" category is selected in action panel 304 to define a data source for "ObjectA" by navigating through a screen (not shown) displayed in main panel 306.

Figure 4:
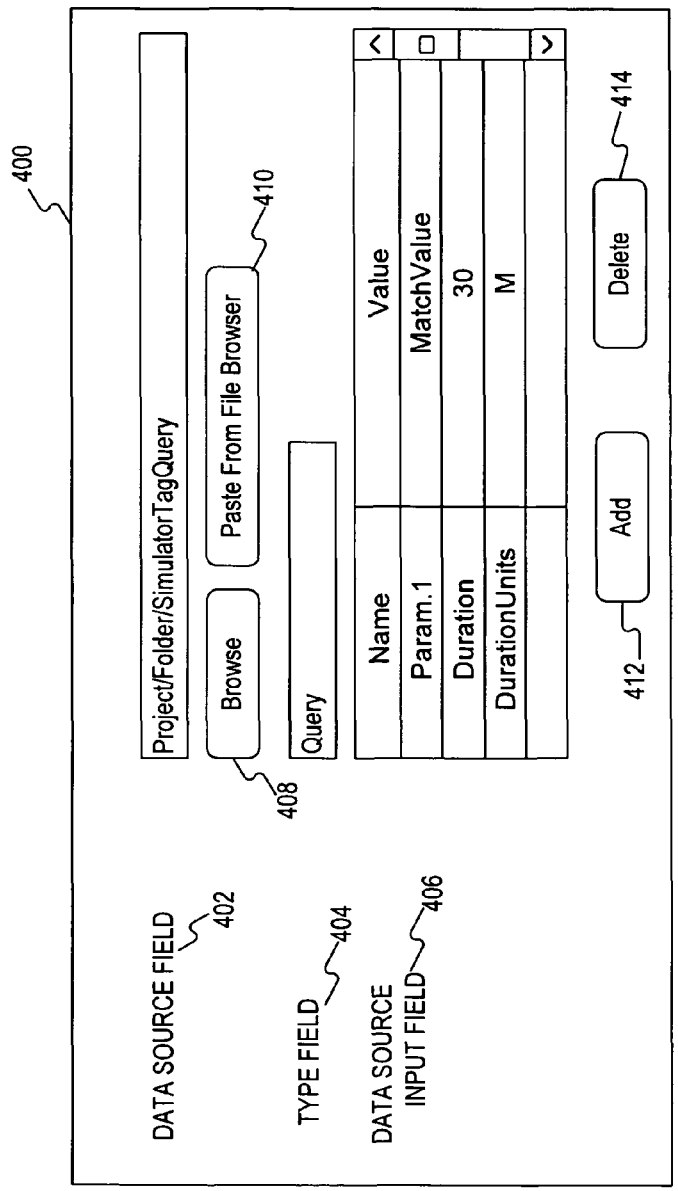
FIG. 4 is snapshot of an exemplary data source screen displayed during setting of a data source for an MDO, consistent with the invention.

FIG. 4 is a snapshot of an exemplary data source screen 400 displayed during setting of a data source for an MDO. Data source screen 400 may be displayed on, for example, display device 214 of system 200, and in main panel 306 of overview screen 300. Data source screen 400 includes data source field 402, a type field 404, and a data source input field 406. Data source field 402 may allow a user to browse through available data sources and to input a path that links a particular MDO to a particular data source by selecting a button 408 labeled "Browse." For example, a user may input the path to a data source included in data sources 222 of system 200. A user may also be able to paste a link in data source filed 402 by selecting a button 410 labeled "Paste From File Browser."

Type field 404 may indicate the type of process that may be used to extract data from the data source identified in data source field 402. The process may include a query, a request, and/or a transaction of a particular predetermined format and/or syntax that, when invoked, is executed to extract data from a data source linked to an MDO. Data source input field 406 may include a table that includes names and values of input parameters that a user may add or delete for a corresponding MDO. These input parameters may be selected from a separate dialog box (not shown) that may appear on the screen when a user clicks on a button 412 labeled "Add," as indicated in FIG. 4. Input parameters already included in the tale may be selected and deleted by using a button 414 labeled "Delete." Further, the input parameters may be added or deleted as name-value pairs.

Figure 5A:
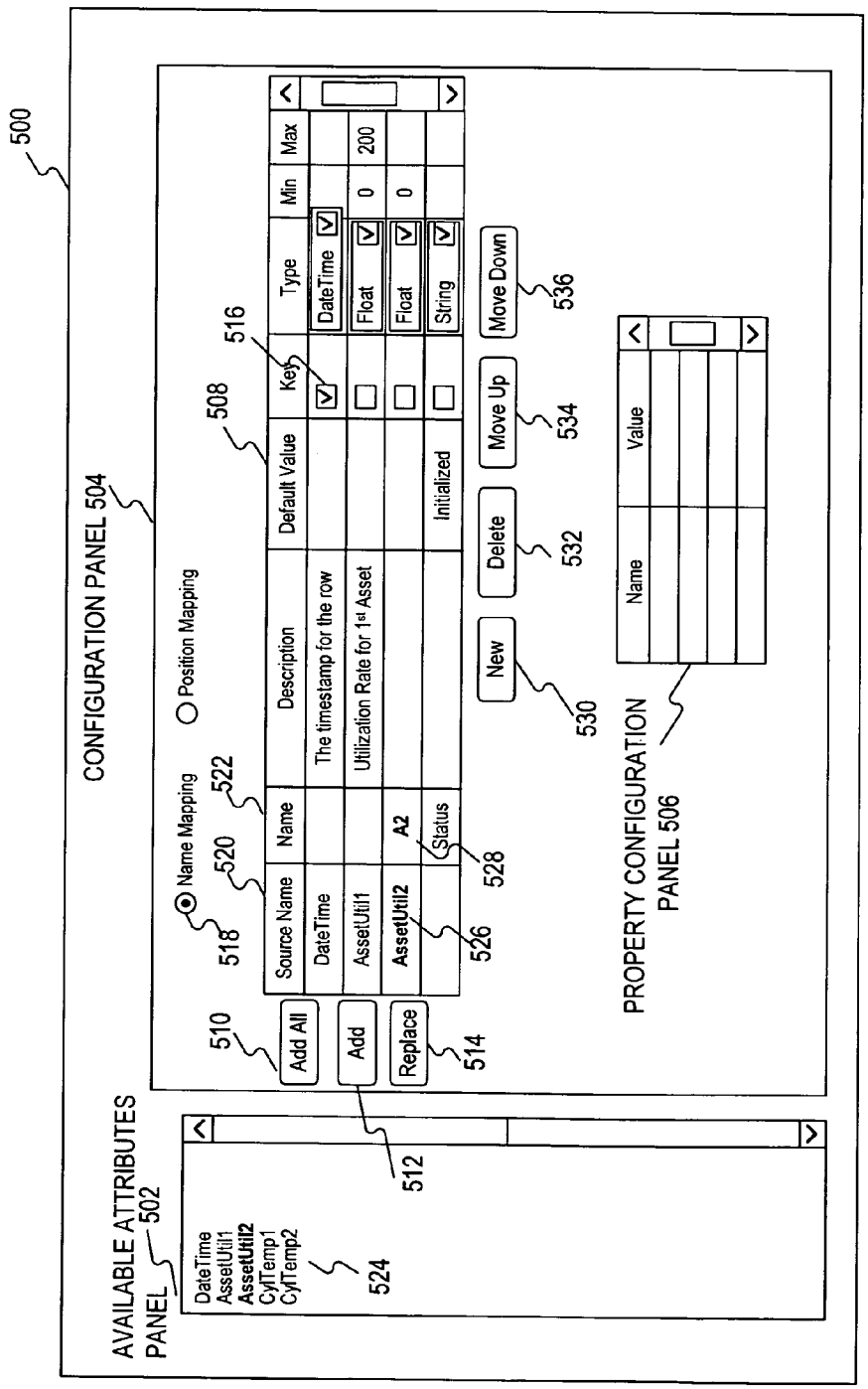
FIG. 5A is a snapshot of an exemplary attribute screen displayed during configuration and mapping of attributes for an MDO, where the mapping is based on attribute names used in a data source, consistent with the invention.

FIG. 5A is a snapshot of an exemplary attribute screen 500 displayed during configuration and mapping of attributes for an MDO, where the mapping is based on attribute names as used in a data source. Attribute screen 500 may be displayed on, for example, display device 214 of system 200. Attribute screen 500 includes available attributes panel 502, configuration panel 504, and property configuration panel 506. Available attributes panel 502 may display attributes of a data source linked to an MDO. For example, the attributes displayed in available attributes panel 502 may be attributes of the data source that may have been selected by a user by inputting a field in data source field 402 of data source screen 400.

Configuration panel 504 may display a database table 508 that may correspond to database table 232 of system 200. Database table 508 may include a plurality of columns and rows that may be filled with attributes extracted from a data source of an MDO. A user may select a button 510 labeled "Add All" to add all the attributes at once, and/or may individually add attributes by individually selecting a button 512 labeled "Add" each time an attribute is selected from available attributes panel 502. A button 514 labeled "Replace" may be selected to replace a particular attribute included in database table 508 with an available attribute selected in available attributes panel 502. As is indicated in FIG. 5A, one of the attributes included in database table 508 may receive a user selection, indicated by check mark 516, to serve as a key for the database table.

Metadata corresponding to the attribute values is also extracted from the selected data source. This metadata may be used to fill in columns of database table 508, and provide additional information regarding the extracted attributes. When "Name Mapping" is selected at 518 in configuration panel 504, column 520 labeled "Source Name" is filled with extracted metadata describing the mapping between the name of extracted attributes included in column 522 labeled "Name" of database table 508 and the names 524 of the extracted attributes in the data source from which the attributes were extracted. For example, the name "AssetUtil2" is included in position 526 of column 520 when attribute "AssetUtil2" and its corresponding values are included in database table 508. The imported attribute may be given a different name "A2" by a user, and this name may be included in position 528 of column 522. In order to facilitate access of the imported attribute and its corresponding values a mapping may be created between positions 526 and 522.

Property configuration panel 506 may stay inactivated until a row of database table 508 is selected, at which time a user may use property configuration panel 506 to customize and edit the name and values of the extracted attributes. For example, a user may change the name of an extracted attribute to A2 from "AssetUtil2." The user may also add new attributes by selecting a button 530 labeled "New", or may change the order of the extracted attributes in database table 508 by selecting buttons 532, 534 labeled "Move Up" or "Move Down." New attributes may also be added by selecting a button 536 labeled "New," and existing attributes may be deleted by selection a button 538 labeled "Delete."

Figure 5B:
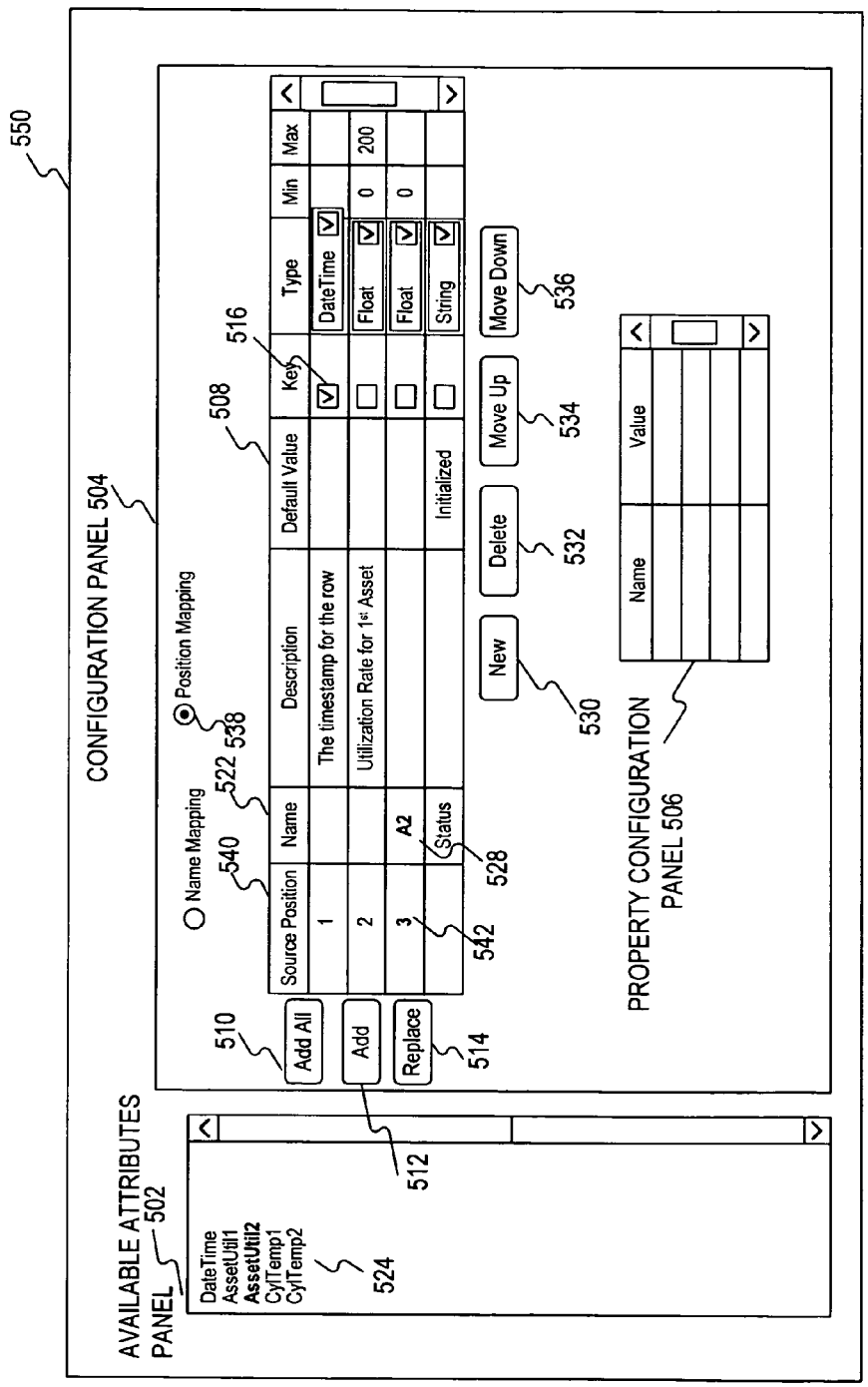
FIG. 5B is a snapshot of an exemplary attribute screen displayed during configuration and mapping of attributes for an MDO, where the mapping is based on positions of attributes in a data source, consistent with the invention.

FIG. 5B is a snapshot indicating an exemplary attribute screen 550 displayed during configuration and mapping of attributes for an MDO, where the mapping is based on positions of attributes in a data source. Attribute screen 550 may be displayed on, for example, display device 214 of system 200. Similar to attribute screen 500, attribute screen 550 includes available attributes panel 502, configuration panel 504, property configuration panel 506, and functionality similar to that described above with respect to FIG. 5A. Attribute screen 550, however, indicates a setting in which "Position Mapping" is selected at 538 and configuration panel 504 displays database table 508 that may include a column 540 named "Source Position." This column includes values that may be obtained from extracted metadata to describe the mapping between the extracted values of attributes imported into database table 508 and the name of the extracted attributes in the data source from which the attributes were extracted. For example, position 542 of column 544 is mapped to position 528 of column 522.

Figure 6:
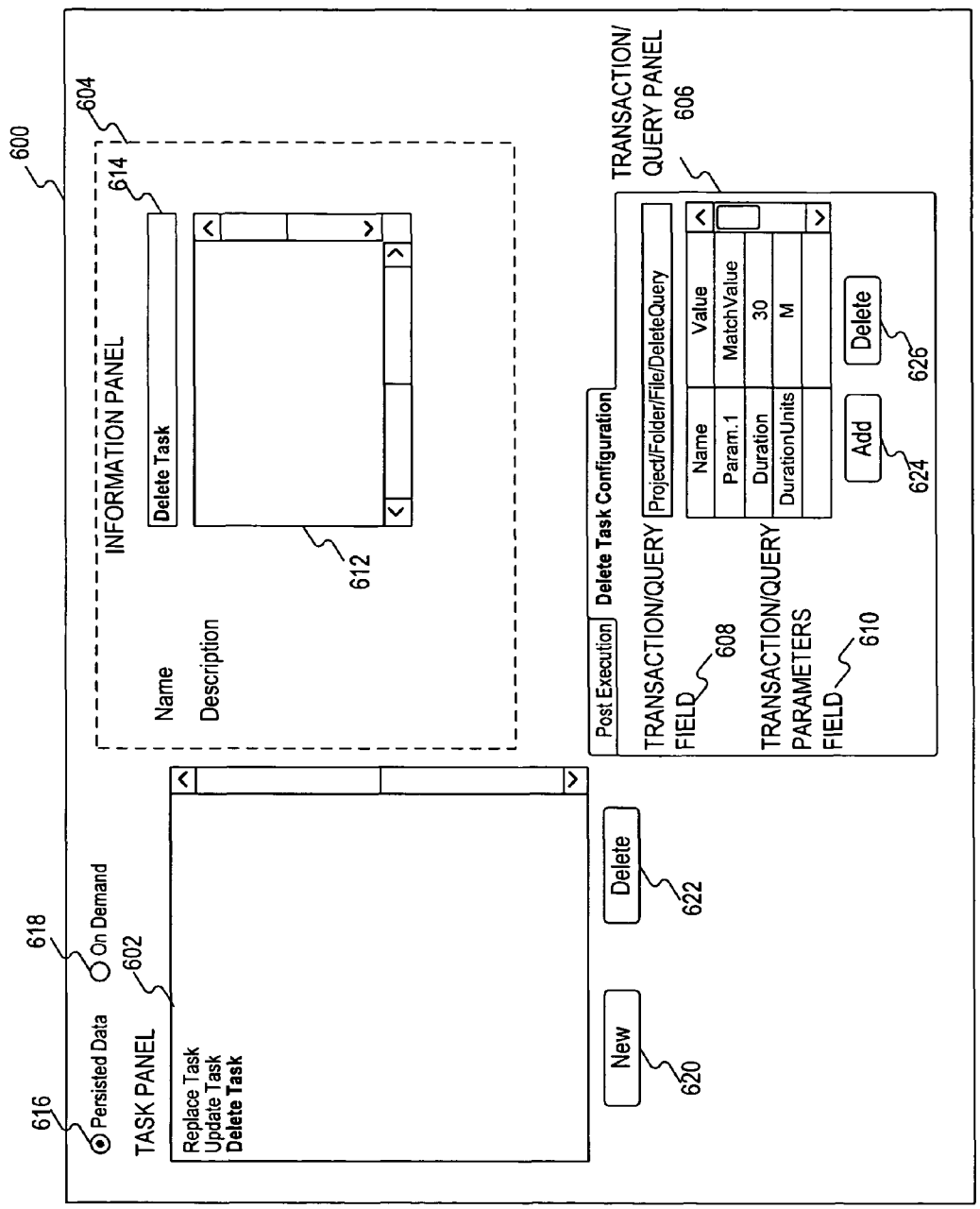
FIG. 6 is a snapshot of an exemplary task screen displayed during setting of a task and a lifecycle of an MDO, consistent with the invention.

FIG. 6 is a snapshot indicating an exemplary task screen 600 displayed during setting of tasks and a lifecycle of an MDO. Task screen 600 may be displayed on, for example, display device 214 of system 200. Task screen 600 includes task panel 602, information panel 604, and transaction/query panel 606. Transaction/query panel 606 may include a transaction/query field 608 and a transaction/query parameters field 610.

Task panel 602 may list the tasks that may be performed to edit a corresponding MDO, description panel 612 may display description information with respect to a task selected in task panel 602, and transaction/query panel 606 may be used to provide parameters that are used to execute a query and/or a transaction to achieve a selected task. For example, as is illustrated in FIG. 6, the "Delete Task" may be selected from task panel 602. Information panel 604 may display the name of the selected task in field 614, the description corresponding to the selected task, and additional description information corresponding to the selected task in description panel 612. To execute the selected "Delete Task" a query or a transaction of a specific format and syntax may be inputted in transaction/query field 608 of transaction/query panel 606. Parameters that may be required to execute the task may be added or deleted by using transaction/query parameters field 610.

The top of task screen 600 includes two buttons 616, 618 labeled "Persisted Data" and "On Demand." These buttons may be used to set a lifecycle of the corresponding MDO. For example, if "Persisted Data" button 616 is selected the extracted data of the corresponding MDO would not be deleted automatically after the MDO is used in a transaction. On the other hand, if "On Demand" button 618 is selected the extracted data of the corresponding MDO would be deleted after the MDO is used in a transaction. Button 620 may be used to add a new task in task panel 602, and button 622 may be used to delete a task from task panel 602. Similarly, buttons 624 and 626 may be used to add and delete parameters from transaction/query parameters field 610.

Additional configuration of an MDO may include providing authorization to users of an a organization to process the MDO. For example, a particular user may only have read capabilities while another user may have both read and write capabilities. Display settings of an MDO may also be configured based on user's preference. Default values may be used during configuration of an MDO when a user does not provide a particular setting or value during configuration of an MDO. These default values may be predetermined and/or may be retrieved from a memory device of a user device being used to configure the MDO. For example, returning now to FIG. 2, the default values may be retreived from memory device 208 and/or memory device 218.

Once the configuration process of an MDO is complete, the configured MDO may be converted and stored in memory device 208 in a particular format. For example, the configured MDO may be stored as definition file 226 that is linked to database table 232. As noted above, the definition file may be of an XML format. The data and attributes of a particular MDO may also be converted into a particular format and may be stored in memory device 208. The data and attributes may also be stored as database table 232 in memory device 218 and/or as a database table in memory device 208. Further, the data and attributes may be temporarily stored in memory device 208 and/or may be deleted from memory device 208 and stored in memory device 218 instead.

User device 204b may need to use a particular MDO that may be stored in user device 204a, and may send a query in a specific syntax or format to user device 204a. The query may be one of select, insert, delete, and update and may include the name of a particular attribute of an MDO that is required to execute the query. For example, the query may be "select [Source Name or Source Position], [Attribute name] from MDOXXXX where [Value of Attribute]=95.45." Processor 210 may receive the query and may convert the query into a second format by performing a mapping between the attribute names included in the receiving attribute and the row and column position in which the attribute is stored. The mapping may be performed by searching for MDOXXXX in definition file 226. While searching the definition file may also be converted from a first format to a second format to facilitate execution of the query. For example, the content from definition file 226 may changed from XML to Java.

Once the MDOXXXX is located in definition file 226, processor 210 may retrieve the requested attribute from memory device 212 and/or database table storage 224. Alternatively, processor may determine the data source of MDOXXXX, as defined in definition file 226. The data source may be included in data sources 222, and processor 210 may retrieve the requested attribute from data sources 222, and provide it to user device 204b. The query may then be executed by using the retrieved attribute. Similarly, user device 204a may also execute a query by using an attribute of an MDO that is defined in definition file 226.

Figure 7:
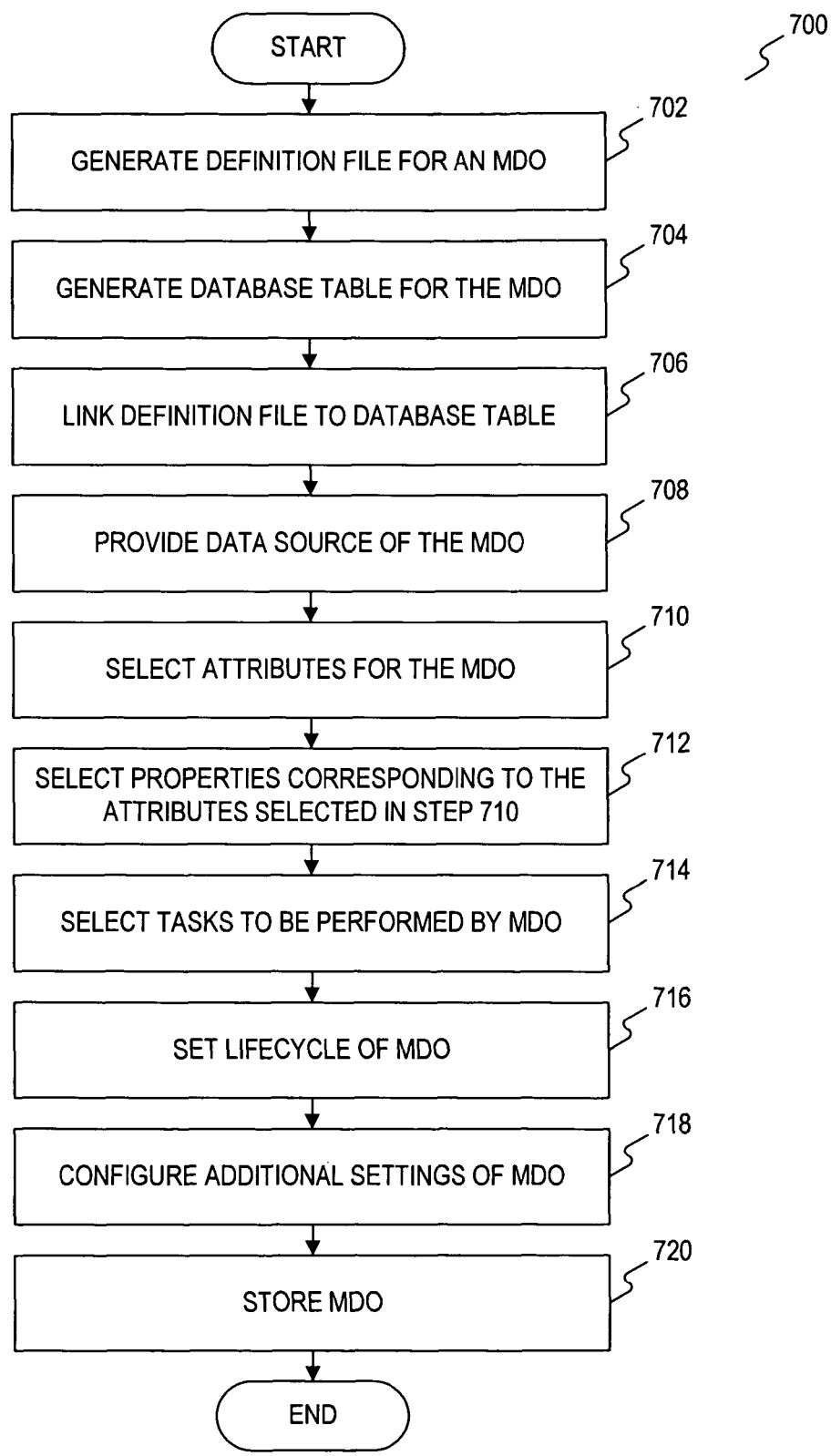
FIG. 7 is a flowchart illustrating an overview of an exemplary method for generation of an MDO, consistent with the present invention.

FIG. 7 is a flow diagram of a method 700 for generating and storing an MDO, consistent with the invention. Method 700 represents operation of user device 204a. The method starts in step 702, where a definition file is generated for an MDO. In step 704, a database table corresponding to the MDO is generated and stored. The database table may include a plurality of rows and columns. Next, the definition file generated in step 702 may be linked with the database table generated in step 704 (step 706). In step 708, a data source of the MDO may be provided, and the definition file may be linked to the data source.

Next, the method moves to step 710, where attributes of the MDO may be selected based on the attributes available in the data source identified in step 708. Properties of the selected attributes may also be selected and customized (step 712). In step 714, tasks that may be performed by using the MDO and the queries, transactions, and/or parameters required to execute the tasks may be selected. The lifecycle of the MDO may also be set (step 716). Next, in step 718, additional settings of the MDO may be configured. The additional settings may include, for example, a security setting providing limited access of the MDO to certain users of an organization, and/or a display setting of the MDO. In step 720, the generated and configured MDO is stored, and the method ends. The MDO may be stored as a database table and a definition file that refers to a data source containing attributes of the MDO. The attributes may be extracted into the database table from the data source when the MDO is invoked in a query and/or the database table may store the attributes. Steps 702-720 may be repeated for generation of additional MDOs.

Figure 8:
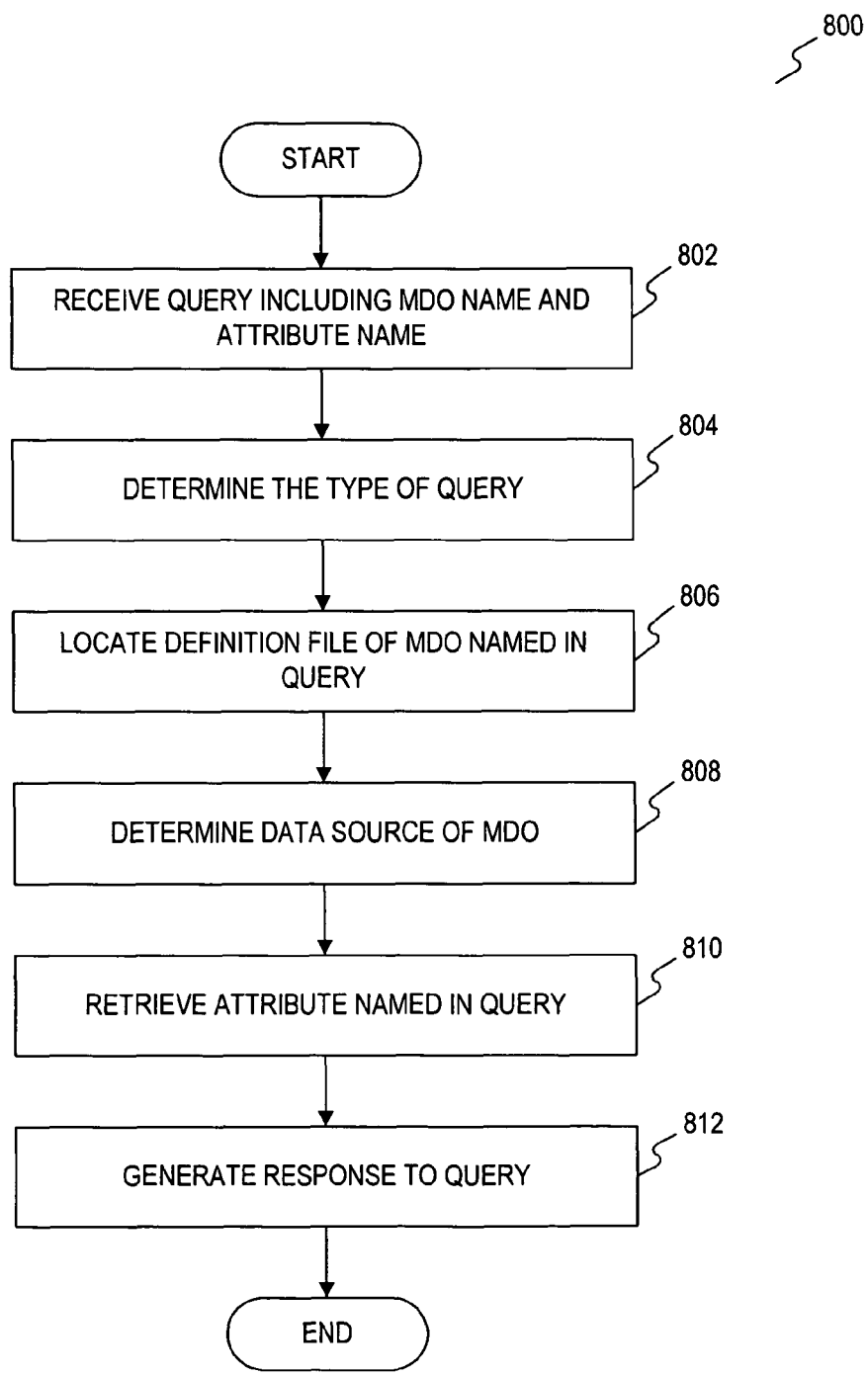
FIG. 8 is a flowchart illustrating an exemplary method for executing a query with a generated MDO, consistent with the present invention.

FIG. 8 is a flow diagram of a method 800 for fulfilling a query using a stored MDO, consistent with the invention. Method 800 starts in step 802, where a query may be received. The query may be received by, for example, user device 204a, and may be one of a select, insert, delete, and update query. The query may be of a specific format and may include the name of an MDO and an attribute name needed to generate a response to the query. In step 804, a type of the query may be determined. Next, a definition file of the MDO named in the query may be located (step 806).

In step 808, the data source of the MDO may be determined based on the definition file. Next, in step 810, the attribute requested in the query in step 802 may be retreived from the data source determined in step 808, and a response to the query may be generated and displayed (step 812). The generated response may be used to develop composite application programs and/or to display information regarding a manufacturing process of an organization. While processing the query, processing the definition file, and retrieving the attribute, the formats of the query, definition file, and attribute may be changed to facilitate generation of the response.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of generating a data object, the method being implemented by a computer system and comprising steps of:

generating, using a processor of the computer system, a definition file of a first format for the data object;

generating a database table;

generating a mapping between the definition file and the database table;

linking the definition file to a data source by including a path of the data source in the definition file, the data source including an attribute, wherein the data source is stored separately from the database table;

executing, using the processor, a query to extract the attribute from the data source;

importing the attribute into the database table using the mapping between the definition file and the database table;

storing, in the memory device, the definition file, the database table, and the attribute for generation of the data object with the attribute;

sending an instruction to edit the database table based on a name-value pair;
selecting, from the data source, a property of the attribute;
customizing the property; and
setting a lifecycle of the data object, the lifecycle indicating a predetermined period of time, wherein the attribute is deleted from the database table when the period of time lapses.

2. The method of claim 1, further comprising converting the definition file from the first format to a second format for generation of the data object.

3. The method of claim 1, wherein the definition file includes an attribute section including a numeric value indicating a number of attribute values of the data object.

4. The method of claim 3, wherein the database table includes:
a unique name of a predetermined format, the unique name indicating a storage location of the definition file; and
a column, wherein the mapping between the definition file and the database table is performed by linking the attribute section and the column, and wherein the imported attribute is included in the column.

5. The method of claim 1, further comprising naming the data object, wherein the query is of a predetermined syntax and includes the name of the data object and a name of the attribute.

6. The method of claim 1, wherein the query is one of select query, update query, delete query, and insert query.

7. The method of claim 1, further comprising:
configuring a display setting of the data object; and
limiting an ability of a user to edit the data object by assigning a security setting.

8. The method of claim 1, further comprising displaying on a display device of the computer system:
a first screen including a data source panel for selection of the data source;
a second screen including an attribute panel for selection of the attribute and a property panel for processing a property of the attribute; and
a third screen including a button for defining a lifecycle of the data object.

9. The method of claim 1, wherein the data object is a manufacturing data object (MDO) and includes description information corresponding to a manufacturing process of an organization.

10. A system of generating a data object comprising:
a memory device having instructions; and
a processor executing the instructions to perform the steps of:
generating a definition file of a first format for the data object;
generating a database table;
generating a mapping between the definition file and the database table;
linking the definition file to a data source by including a path of the data source in the definition file, the data source including an attribute, wherein the data source is stored separately from the database table;
executing, using the processor, a query to extract the attribute from the data source;
importing the attribute into the database table using the mapping between the definition file and the database table;
storing the definition file, the database table, and the attribute for generation of the data object with the attribute;
sending an instruction to edit the database table based on a name-value pair;
selecting, from the data source, a property of the attribute;
customizing the property; and
setting a lifecycle of the data object, the lifecycle indicating a predetermined period of time, wherein the attribute is deleted from the database table when the period of time lapses.

11. The system of claim 10, wherein the processor executes the instructions for converting the definition file from the first format to a second format for generation of the data object.

12. The system of claim 10, wherein the definition file includes an attribute section including a numeric value indicating a number of attribute values of the data object.

13. The system of claim 12, wherein the database table includes:
a unique name of a predetermined format, the unique name indicating a storage location of the definition file; and
a column, wherein the mapping between the definition file and the database table is performed by linking the attribute section and the column, and wherein the imported attribute is included in the column.

14. The system of claim 10, wherein the processors executes the instructions for naming the data object, wherein the query is of a predetermined syntax and includes the name of the data object and a name of the attribute.

15. The system of claim 10, wherein the query is one of select query, update query, delete query, and insert query.

16. The system of claim 10, wherein the processors executes the instructions for:
configuring a display setting of the data object; and
limiting an ability of a user to edit the data object by assigning a security setting.

17. The system of claim 10, further comprising display device displaying:
a first screen including a data source panel for selection of the data source;
a second screen including an attribute panel for selection of the attribute and a property panel for processing a property of the attribute; and
a third screen including a button for defining a lifecycle of the data object.

18. The system of claim 10, wherein the data object is a manufacturing data object (MDO) and includes description information corresponding to a manufacturing process of an organization.

19. A computer-readable storage medium including instructions which, when executed on a processor, cause the processor to perform a method of generating a data object, the method including steps, performed by a computer, of:
generating, using a processor of the computer system, a definition file of a first format for the data object;
generating a database table;
generating a mapping between the definition file and the database table;
linking the definition file to a data source by including a path of the data source in the definition file, the data source including an attribute, wherein the data source is stored separately from the database table;
executing, using the processor, a query to extract the attribute from the data source;
importing the attribute into the database table using the mapping between the definition file and the database table;

storing the definition file, the database table, and the attribute for generation of the data object with the attribute;

sending an instruction to edit the database table based on a name-value pair;

selecting, from the data source, a property of the attribute;

customizing the property; and setting a lifecycle of the data object, the lifecycle indicating a predetermined period of time, wherein the attribute is deleted from the database table when the period of time lapses.

20. The computer-readable storage medium of claim 19, wherein the method further comprises the steps of:

converting the definition file from the first format to a second format for generation of the data object;

naming the data object, wherein the query is of a predetermined syntax and includes the name of the data object and a name of the attribute;

configuring a display setting of the data object; and limiting an ability of a user to edit the data object by assigning a security setting.

* * * * *